United States Patent [19]

Koerner et al.

[11] 4,217,228

[45] Aug. 12, 1980

[54] TEXTILE FIBER FINISHES

[75] Inventors: Götz Koerner, Essen; Hans Rott, Gladbeck, both of Fed. Rep. of Germany

[73] Assignee: Th. Goldschmidt AG, Essen, Fed. Rep. of Germany

[21] Appl. No.: 13,250

[22] Filed: Feb. 21, 1979

[30] Foreign Application Priority Data

Feb. 23, 1978 [GB] United Kingdom ............... 07345/78

[51] Int. Cl.$^2$ ............................................. D06M 15/66
[52] U.S. Cl. ...................................... 252/8.6; 252/46.3; 556/450; 556/456
[58] Field of Search ............................... 252/8.6, 46.3; 260/448.2 R, 448.2 B

[56] References Cited

U.S. PATENT DOCUMENTS

| | | | |
|---|---|---|---|
| 3,155,634 | 11/1964 | Pike | 260/448.2 R |
| 3,183,254 | 5/1965 | Rossmy et al. | 260/448.2 R |
| 3,896,032 | 7/1975 | Stroh et al. | 252/8.6 |
| 4,098,701 | 7/1978 | Burrill et al. | 252/8.6 |

*Primary Examiner*—John Kight, III
*Attorney, Agent, or Firm*—Toren, McGeady and Stanger

[57] ABSTRACT

A textile fiber finish composed of 1 to 99 percent by weight of silico-organic compounds having the formula

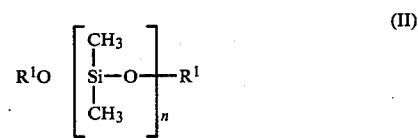

and 99 to 1 percent by weight of conventional finish components.

This finish exhibits good lubricating properties at high temperatures and does not leave residues or oils on high temperature texturizing and fiber treating equipment.

7 Claims, No Drawings

TEXTILE FIBER FINISHES

BACKGROUND OF THE INVENTION

1. Field of the Invention

This invention relates to preparations for treatment of fibers which are especially suitable for the treatment of synthetic fibers, e.g., polyester fibers, which are obtained by melt spinning.

2. Description of the Prior Art

Polydimethylsiloxanes are used for the preparation of melt spun fibers. These polydimethylsiloxanes, usually called silicone oils for simplicity's sake, impart to fibers treated with these oils, a lower coefficient of friction, especially at high yarn winding speeds wherein this friction coefficient has a small temperature dependency. Moreover, silicone oils are extraordinarily heat-resistant and have a low viscosity-temperature coefficient.

The treatment of melt-spun yarns with such preparations or "finishes" directly after their production renders possible the subsequent stretching and texturizing processes of said yarns. For such purposes, the preparation has to be effective as a lubricant and antistatic agent. In thermosetting treatments of the yarn, finish components are often transferred unintentionally onto heating units and are subjected to heat in the unit for a long time. Therefore, the preparation has to be thermally stable. The preparation transferred on the heating units should, if possible, not turn to gel, turn yellow or evaporate. It is most important that it will not turn to gel.

At the same time, the finish components should be as compatible as possible with each other. This is especially a great problem with regard to the compatibility between polar, tensidic components, which are primarily responsible for the antistatic efficiency, and the nonpolar methylsilicone oils, which are mainly responsible for the lubricating properties. The compatibility of the preparation components is especially important when the preparation is to be applied to the fibers directly in the form of an oil, i.e., without being previously dissolved or emulsified.

The compatibility of methylsilicone oils especially with paraffinic substances can be improved if the methyl groups are partially substituted by longer chained alkyl groups. The resulting oils, however, no longer possess sufficient thermal stability. Moreover, the viscosity-temperature coefficient of such modified methylsilicone oils rises significantly.

The partial substitution of methyl groups by phenyl groups also leads to products with higher viscosity-temperature coefficients which results in decrease in the lubricating properties.

Certain aryloxy substituted silicone oils turn out to be especially suitable components for melt-spinning as compared to the oils used in the art. The compatibility of these aryloxy substituted silicone oils to other common preparation components has been surprisingly improved. These aryloxy substituted silicone oils have exceptional thermal stability and they give melt-spinning preparations remarkable lubricating properties.

Moreover, these aryloxy substituted silicone oils can be produced easily and relatively inexpensively. German Offenlegungsschrift 26 45 459 describes a textile fiber preparation which is characterized by a content of 1 to 99% by weight of compounds of the general formula

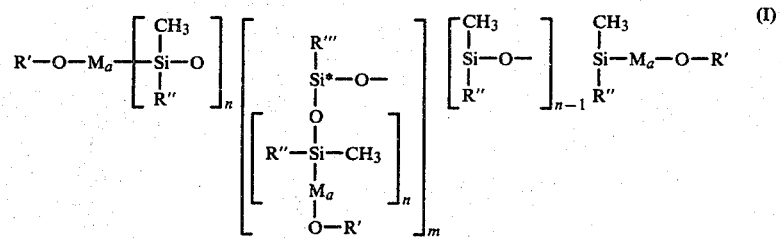

wherein
R' is mono-, di- or trialkylphenyl, the sum of carbon atoms in the alkyl portions of the phenyl group being 6 to 12, or trimethylsilyl,
R" is an alkyl group with 1 to 16 carbon atoms, wherein the carbon chain may be interrupted by the group

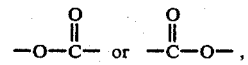

and/or wherein the residue is $M_a$—O—R'''', R'''' being a mono-, di- or trialkylphenyl wherein the sum of the carbon atoms in the alkyl portion of the phenyl is 6 to 12 or is the residue

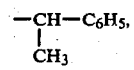

R''' is an alkyl group with 1 to 16 carbon atoms or

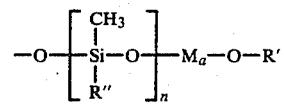

M is an alkyl group with 1 to 3 carbon atoms and
n is 2.5 to 15,
m is 0 to 5, and
a is 0 or 1,
the average molecule having formula (I) has 5 to 30 Si-atoms, of which at least 20 mol% are Si* atoms and 0.5 to 10 are mono-, di- or trialkylphenyl, and 99 to 1% by weight of known or conventional components.

This formula represents the average formula of the polymer mixture.

The above-mentioned known textile fiber preparation as described in German Offenlegungsschrift 26 45 459, has been demonstrated in practice. However, the compatibility of such compounds with tensides, and particularly with cationic and anionic tensides, is sometimes too low. Moreover, the viscosity of this preparation is too high which results in difficulties when these finishes are used with very fine textile fibers.

SUMMARY OF THE INVENTION

The object of the invention is to create a preparation having improved compatibility with tensides, especially with cationic or anionic tensides and whose viscosity is so low that the finish can be used with very fine textile fibers. Moreover, it is desirable that the antistatic effect of the preparation be increased with a viscosity as low as possible even when the finish is subjected to high temperatures.

We have discovered that these properties are possessed by a preparation containing silico-organic compounds containing hydroxy groups bound to Si atoms and having trialkyl, triaryl, and/or trialkylarylsiloxy groups and/or a phenoxy or mono-, di- or trialkylphenoxy respectively, wherein the sum of the carbon atoms in the alkyl groups attached to the phenyl residues is less than 12.

Therefore, the invention relates to a textile fiber preparation or finish especially useful for finishes used in melt spinning which is composed of 1 to 99% by weight of compounds of the general formula

(II)

wherein
R$^1$ is 15 to 96 mole percent of hydrogen residues, and from 85 to 4 mole percent of trialkylsilyl, triarylsilyl, tri(alkylaryl)silyl, phenyl, mono-, di- or trialkylphenyl, wherein the sum of the number of carbon atoms per phenyl group is no more than 12, and the index
n has a value from 3 to 30,
and 99 to 1% by weight of conventional preparation components.

It is noted that formula (II) represents an average formula of a polymer mixture.

DESCRIPTION OF THE PREFERRED EMBODIMENT

The definition of the residue R$^1$ is of essential importance for the invention. Specifically, 15 to 96 mole percent of R$^1$ are hydrogen residues, 4 to 85 mole percent of R$^1$ are trialkyl, triaryl, trialkylarylsilyl, phenyl or mono-, di- or trialkylphenyl.

Especially preferred as trialkylsilyl is trimethylsilyl. However, trialkylsilyl whose alkyl group has more than 1 carbon atom, for example, triethylsilyl, can also be used. Higher trialkylsilyls are less preferred because they are less available and the thermal stability of the compound is lowered. As triarylsilyl, triphenylsilyl is preferred. Preferred trialkylarylsilyls are those wherein the alkyls are lower alkyls, especially methyl, and the aryl is phenyl. An example of such a group is the dimethylphenylsilyl. In the indicated ranges of mole percent, R$^1$ is preferably hydrogen or trimethylsilyl group. Preferably, the index n has a value from 6 to 20.

It is essential that R$^1$ consists of from 15 to 96 mole percent hydrogen while the remaining mole portions consist of chain limiting trihydrocarbon silyl groups, phenyl, or mono-, di- or trialkylphenyl groups. This assures that under increased temperatures, condensation reactions in which water is separated can be stopped. This, in turn, assures that the silico-organic compounds contained in the textile fiber preparation of the invention, cannot turn into a gel but rather, remain liquid.

The silico-organic compounds included in the textile preparation can be produced in a manner known per se by converting the corresponding chlorosiloxanes or chlorosiloxanylsulfates, respectively, for example, by means of ammonium hydroxide, according to German patent No. 13 00 697. The chlorosiloxanylsulfates or the chlorosiloxanes can be obtained by equilibration with sulfuric acid according to U.S. Pat. No. 3,183,254 or by equilibration utilizing ferric-(III)-chloride (described in W. Noll "Chemie und Technologie der Silicone," Verlag Chemie, 1968, page 190).

The textile fiber preparations according to the invention can contain, in addition to the silico-organic compounds referred to herein as substances of group (A), 1 to 99% by weight of known preparation or conventional textile finish components. Examples of such conventional preparation components are substances which are unpolar or weakly polar and do not adversely affect the lubricating properties even at very high yarn unwinding speeds (herein referred to as group B). To group B belong, for example, the so-called ester oils, such as, fatty acids of polyols. Such compounds are, for example, trimethylolpropane tripelargonate or pentaerythritol tetrapelargonate or esters of monools, such as, stearic acid hexadecylester, stearic acid butylester or oleyloleate. Ester oils can also be dialkylphthalates, the dialkylphthalates derived from branched secondary and primary alcohols being of special interest.

Ester oils which are derived from aliphatic dicarbon acids are also usable. Mineral oils or liquid oligomeric polyolefines, respectively, are less expensive unpolar preparation components; however, such preparation components are inferior to ester oils with regard to thermal stability. Hydrophobic polypropyleneglycols are also substantially unpolar components; however, in comparison with the ester oils, they have also disadvantages with respect to their thermal resistance. The viscosities (at 20° C.) of the unpolar or weakly polar oils, respectively, of the group B are generally between 5 and 100 cP, and preferably, 10 to 60 cP.

Most melt-spinning preparations include additional compounds which can be divided into components designated as group C and group D according to their polarity which is more or less strong, respectively.

The weakly polar, non-ionic components of group C have, as their purpose, inter alia, to develop a good antistatic effect and, if needed, to improve the compatibility of the unpolar portions (group B) with highly polar ionic components (group D) which are commonly used as highly effective antistatics. Typical representatives of non-ionic preparation components of group C are water-soluble or water-dispersible ethylene oxide adducts of fatty acids, fatty alcohols, fatty amines or fatty acid amides, the liquid low-viscosity representatives of this group being preferred.

Especially suitable is C$_{12}$H$_{35}$N(CH$_2$CH$_2$OH)$_2$, wherein the C$_{12}$H$_{25}$ residue represents a corresponding mixture of C$_8$H$_{17}$—, C$_{10}$H$_{21}$—, C$_{12}$H$_{25}$—, C$_{14}$H$_{25}$—, C$_{16}$H$_{33}$—, and C$_{18}$H$_{37}$—residues.

The OH-groups of the polyoxyethylene derivatives can be completely or partly esterified or alkoxylated. Conversion products of ethylene oxide with partial polyol esters of fatty acids, such as, glycerine or sorbit ester, respectively, for example, sorbit monooleate or glycerintrioleate, are also suitable. The conversion products of ethylene oxides and alkylphenols, such as, for example, nonylphenol, are especially thermally stable, non-ionic preparation components.

The strongly polar preparation portions of group D comprise mostly liquid organic tensides which have ionic groups and can be anionic, amphoteric or cationic. These compounds are, above all, important as highly effective antistatic additions. Typical anionic tensides of this group are alkali salts of alkylphosphate or alkylphosphonates, respectively, for example, mixtures of alkali salts of mono-, and dialkylphosphoric acid esters. In addition, sulfurized mineral oils or fatty alcohol sulfates, respectively, or alkylpolyethersulfates, and alkali salts of unsaturated higher fatty acids also belong to this group and are suitable for use. Further representatives of this group are the alkali salts of alkyl benzenesulfonates. Typical amphoteric tensides of this group are the tensidic betaines.

The cationic tensides are of special importance as melt-spinning preparation components, such as, alkyltrimethyl ammonium sulfates, for example, coco trimethyl ammonium methosulfate.

Specially suitable is

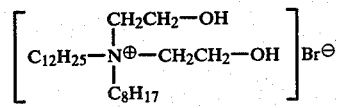

wherein the $C_{12}H_{25}-$ represent the statistic means of the $C_8-$, $C_{10}-$, $C_{12}-$, $C_{14}-$, $C_{16}-$, $C_{18}-$components.

The OH—groups can be partly or completely alkoxylated or esterified. Furthermore, also quaternary imidazolines, formed, for example, from fatty acids, such as, oleic acid and hydroxyethylethylene diamine, are suitable (Cationic Surfactants, Vol. 4, E. Jungermann, M. Dekker, New York 1970, page 115).

Because of the low thermal stability of the components of group D which have strongly polar ionic groups and their poor compatibility, only the minimum required amounts of these compounds are used. Antistatically effective compounds of groups C and D have been comprehensively described by W. Biedermann in the journal "Plaste und Kautschuk," 16, 8–15 (1969) as well as by L. R. Kumar in the journal Silk, Rayon Ind., India 12, 315–333 (1969).

The present invention particularly relates to preparations which consist of:

1 to 99 weight percent of silico-organic compounds (group A),
0 to 80 weight percent of non-polar or weakly polar oils, respectively (group B),
0 to 90 weight percent of non-ionc compounds (group C), and
0 to 90 weight percent of ionogenic tensides (group D),
wherein the sum of the components must result in 100 weight percent and the portion of the non-ionic and ionogenic tensides must be at least 1 weight percent.

Preparations are especially preferred which consist of
10 to 95 weight percent of silico-organic compounds (group A),
0 to 80 weight percent of non-polar or weakly polar oils, respectively (group B),
0 to 90 weight percent of non-ionic compounds (group C), and
0 to 90 weight percent of ionogenic tensides.

According to the type of end use, these substances can be used in the above-described mixture undiluted or diluted in the form of solutions wherein hydrocarbons are preferably suitable as the solvent. They may also be used in the form of emulsions wherein conventional emulsifiers may be used. Furthermore, other conventional additions, such as, oxidation inhibitors which include phenols, e.g., dicresylpropane, or sodium hypophosphite, may be added to the preparation.

Because of the good compatibility of the silicone oils used in the present invention, solvent-free melt-spinning preparations which are self-emulsified and, therefore, easily washable and compatible, can be produced. As a result, solvent loading can be avoided.

The preparations of the present invention possess improved antistatic effects and a decreased viscosity which is maintained even when the system is at higher temperatures. The silico-organic compounds included in the preparations cannot turn to gel and do not turn yellow.

In the following examples, production and properties of silico-organic compounds and preparations in accordance with the present invention are described.

EXAMPLE 1

Production of a siloxane of formula (II) wherein $n=13.6$ and $R^1=14$ mole percent of trimethylsilyl groups and 86 mole percent hydrogen:

(a) Obtaining of an Equilibrated Chlorosiloxane 296.4 g (1 mole) of octamethylcyclotetrasiloxane are mixed with 51.6 g (0.4 mole) of dichlorodimethylsilane, 7.2 g (0.044 mole) of hexamethyldisiloxane and 0.36 g (0.1%) dehydrated $FeCl_3$.

This mixture is stirred for two hours at ambient temperature. Then, the content of the flask is heated to 50° C. and is stirred vigorously for 20 hours. Afterwards, the flask is heated to 100° C. for two more hours. After allowing the precipitate to settle down, the mixture was filtered and the acid value determined.

Yield: quantitative;
Acid value: theoretically $2.25 \times 10^{-3}$ Val/g
found: $2.17 \times 10^{-3}$ Val/g (b) Production of the Final Product To a mixture of 59 g (0.87 mole) of 25% aqueous ammonia, 237 g (13.2 mole) water and 237 g of toluene, 355 g (0.44 mole) of the initial product (chlorosiloxane) was added dropwise with intensive stirring. The temperature of the reaction mixture should not exceed 30° C. After the dropwise addition is finished, the mixture is stirred for 15 more minutes and then neutralized with acetic acid. The organic phase is separated and the solvent is removed by careful distillation under water-jet pump vacuum in a rotary evaporator. When no additional distillate accumulates, the remaining solvent is removed within one hour under oil pump vacuum at a sump temperature of 50° C.

Yield: >95% of the theoretical value,
OH—content: 2.8%
This compound had the composition mentioned above.

EXAMPLE 2

Production of a siloxane of formula (II) wherein n—12.8 and $R^1$=52 mole percent of nonylphenyl groups and 48 mole percent hydrogen:

(a) Obtaining Equilibrated Chlorosiloxane 666.9 g (2.25 mole) of octamethylcyclotetrasiloxane are equilibrated with 129.1 g (1 mole) of dichlorodimethylsilane and 0.795 g (0.1%) of dehydrated $FeCl_3$ according to the procedure of Example 1 (a).
Yield: quantitative,
Acid value: theoretical: $2.51 \times 10^{-3}$ Val/g
found: $2.46 \times 10^{-3}$ Val/g

(b) Reaction of the Chlorosiloxane with Nonylphenol 813 g (1 mole) of the chlorosiloxane are made available and 180 g (0.82 mole) of nonylphenol, dissolved in 200 ml toluene, are slowly added drop by drop. Afterwards, 64.8 g (0.82 mole) of pyridine are added within 30 minutes. The sedimented pyridine hydrochloride is separated by filtration.
Acid value: $1.14 \times 10^{-3}$ Val/g

(c) Production of the Final Product from the Above-Obtained Intermediate Product To a mixture of 93 g (1.37 mole) of 25% aqueous ammonia, 670 g (37.2 mole) water and 670 g toluene, the intermediate product from step (b) is added dropwise with intensive stirring. The mixture was further treated pursuant to the procedure set forth in Example 1 (b).
Yield: 95% of the theoretical value
OH—content: 1.4%
This compound has the composition stated hereinabove.

The other OH—siloxanes contained in the preparation according to the invention are produced in the same manner. The following table shows a comparison between known compounds indicated by the numbers 1 to 9 and the compounds according to the present invention indicated by numbers 10 to 26. Compounds tabulated under numbers 5 and 6 have been described in detail in German Offenlegungsschrift 26 45 459 and German Offenlegungsschrift 26 45 890.

The content of volatile components indicated in the eighth column was determined according to U.S. Pat. No. 3,578,594, column 15, paragraph 1, line 4.

Moreover, in columns a, b and c, Nos. 1 to 26, mixtures of substances with commercially available preparations for reducing the antistatic level were used. In the case of the cationic antistatic, a quaternary imidazoline derivative produced by the quaternization of an imidazoline of hydroxyethylenediamine and oleic acid was used. Under (b), a mixture with an anionic antistatic based on a phosphoric acid ester was used. The material of column (c) contains mixtures of a phosphoric acid ester produced by esterifying phosphoric acid with a reaction product of lauryl alcohol and ethylene oxide, the remaining acid groups being neutralized with phosphoric acid.

The table shows that the components for the fiber treatment means in accordance with the invention, tabulated under numbers 1 to 3, are mixable with anionic antistatics but gelatinize very quickly at a temperature of 200° C. and, therefore, are not suitable for practical use. Moreover, they are not mixable with cationic antistatics. Methylsilicone oil, tabulated under number 4, has good resistance against gelatinizing. However, because of its incompatibility with ionic antistatics, it is not usable. In contrast, the compounds shown under 5 and 6 represent a remarkable improvement with respect to both resistance to gelling as well as compatibility with ionic antistatics.

As shown in the table, however, they do not possess sufficient compatibility with cationic antistatics. The substances according to the invention fulfill these conditions. The are, depending on the lengths of the molecular chains, resistant to gelling for over 200 hours and are mixable with anionic as well as with cationic antistatics.

In contrast, siloxanols not in accordance with the present invention and which have two or more OH—groups per mole, gelatinize after a short time, as shown under Nos. 7 and 8. Finally, the siloxanol shown under No. 9 is, due to the definition of $R^1$, not within the scope of products which are claimed in accordance with the present invention since it contains too few trimethylsilyl groups and gelatinizes within a short time.

In the last column, the antistatic behavior of mixtures of compounds within and without the scope of the invention with the above-mentioned antistats are listed. The surface resistance was determined with an arrangement according to DIN 53 482. The mixtures of the preparation compounds according to the invention do not gelatinize under normal melt-spinning temperature conditions. Tests have shown that, when using the preparations according to the invention, textile fibers and other technical fibers can be produced even under thermal texturizing and treatment conditions because of the good resistance against gelatinizing and the extraordinary separation properties without the formation of troublesome deposits on the heating units or the fibers.

| | No. | Product | $R^1$ | | n | Number of Si-atoms per molecule | Viscosity (20° C., cP) | Production Process |
|---|---|---|---|---|---|---|---|---|
| not according to the invention | 1 | technical white oil(5° C.) | — | | — | — | 37.5 | — |
| | 2 | trimethylolpropane-tripelargonate | — | | — | — | 45.0 | — |
| | 3 | pentaerythritoltetra-pelargonate | — | | — | — | 80.0 | — |
| | 4 | methylsilicone oil 25 cP | — | | — | >15 | 25.0 | — |
| | 5 | product according to German OS 26 45 459 | nonylphenyl 60 mole % | | 5 | 5 | 60.0 | — |
| | 6 | product according to | | | | | | |

-continued

| | No. | | | | | | |
|---|---|---|---|---|---|---|---|
| | | German OS 26 45 890 | 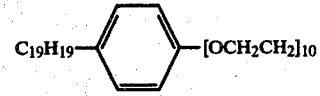 and 40 mole % nonylphenyl | 15.4 | 15.4 | 199.0 | — |
| | 7 | siloxane diol | 100 mole % H | 9.9 | 9.9 | 37.1 | — |
| | 8 | siloxane diol | 100 mole % H | 19.1 | 19.1 | 44.2 | — |
| | 9 | product according to formula (II) | 3 mole % trimethylsilyl and 97 mole % H | 7.0 | 7.1 | 36.0 | 1 |
| according to the invention | 10 | product according to claim 1 | 6 mole % trimethylsilyl and 94 mole % H | 7.0 | 7.2 | 34.9 | 1 |
| | 11 | product according to claim 1 | 15 mole % trimethylsilyl and 85 mole % H | 7.8 | 8.1 | 27.2 | 1 |
| | 12 | product according to claim 1 | 14 mole % trimethylsilyl and 86 mole % H | 13.8 | 14.1 | 34.3 | 1 |
| | 13 | product according to claim 1 | 16 mole % trimethylsilyl and 84 mole % H | 15.7 | 16.0 | 31.4 | 1 |
| | 14 | product according to claim 1 | 15 mole % trimethylsilyl and 85 mole % H | 29.6 | 30.5 | 52.3 | 1 |
| | 15 | product according to claim 1 | 23 mole % trimethylsilyl and 77 mole % H | 7.4 | 7.9 | 23.5 | 1 |
| | 16 | product according to claim 1 | 24 mole % trimethylsilyl and 76 mole % H | 14.0 | 14.5 | 34.9 | 1 |
| | 17 | product according to claims 1 | 23 mole % trimethylsilyl and 77 mole % H | 26.7 | 27.2 | 50.8 | 1 |
| according to invention | 18 | product according to claim 1 | 45 mole % trimethylsilyl and 55 mole % H | 7.0 | 7.9 | 22.7 | 1 |
| | 19 | product according to claim 1 | 45 mole % trimethylsilyl and 55 mole % H | 13.2 | 14.1 | 28.7 | 1 |
| | 20 | product according to claim 1 | 45 mole % trimethylsilyl and 55 mole % H | 27.2 | 28.1 | 46.0 | 1 |
| | 21 | product according to claim 1 | 79 mole % trimethylsilyl and 21 mole % H | 9.0 | 10.6 | 13.1 | 1 |
| | 22 | product according to claim 1 | 84 mole % trimethylsilyl and 16 mole % H | 9.0 | 10.7 | 12.3 | 1 |
| | 23 | product according to claim 1 | 45 mole % nonylphenyl and 55 mole % H | 13.5 | 13.5 | 31.0 | 2 |
| | 24 | product according to claim 1 | 80 mole % di-sec.-butylphenyl and 20 mole % H | 15.5 | 15.5 | 51.2 | 2 |
| | 25 | product according to claim 1 | 80 mole di-tert.-butylphenyl and 20 mole % H | 15.5 | 15.5 | 52.8 | 2 |
| | 26 | product according to claim 1 | 70 mole % phenyl and 30 mole % H | 13.5 | 13.5 | 15.2 | 2 |

| | No. | Contents of Volatile Components (3 g weighed sample, metal bowl φ 5.2 cm; 16 hours at 200° C.) weight % | Gelation Time (hours) at 200° C. | Compatibility with Antistats | | | Antistats (specific surface resistance in Ω) Product mixed with | | |
|---|---|---|---|---|---|---|---|---|---|
| | | | | cationic 10% a | anionic 20% b | anionic hydroxy alkoxylated 20% c | 10% a | 20% b | 20% b |
| not according to the invention | 1 | >95 | <8 | not mixable | not mixable | clear | — | — | 2 × 10¹⁰ |
| | 2 | 36 | 24 | not mixable | clear | clear | — | 2 ×10¹⁰ | 2 × 10¹⁰ |
| | 3 | 22 | 24 | not mixable | clear | clear | — | 2 ×10¹⁰ | 2 × 10¹⁰ |
| | 4 | 32 | >500 | not mixable | not mixable | not mixable | — | — | — |
| | 5 | 42 | >200 | not mixable | clear | clear | — | 2 × 10⁹ | 1.5 × 10¹⁰ |
| | 6 | 49 | 36 | not mixable | clear | clear | — | 2 × 10⁸ | 1.5 × 10⁹ |
| | 7 | 55 | 2 | clear | clear | clear | 1.5 × 10⁹ | 1 × 10⁹ | 1 × 10¹⁰ |
| | 8 | 23 | 2 | clear | clear | clear | 6 × 10⁹ | 1 × 10⁹ | 1 × 10¹⁰ |
| | 9 | 56 | 5 | clear | clear | clear | 3 × 10⁸ | 2 × 10⁸ | 6 × 10⁹ |
| according to the invention | 10 | 58 | 95 | clear | clear | clear | 1 × 10⁹ | 1 × 10⁹ | 1 × 10¹⁰ |
| | 11 | 63 | 115 | clear | clear | clear | 2 × 10⁹ | 1 × 10⁹ | 3 × 10¹⁰ |
| | 12 | 36 | >220 | clear | clear | clear | 2 × 10⁹ | 1 × 10⁹ | 1 × 10¹⁰ |
| | 13 | 35 | >220 | clear | clear | clear | 2 × 10⁹ | 1 × 10⁹ | 1 × 10¹⁰ |
| | 14 | 19 | >220 | clear | clear | clear | 5 × 10⁹ | 1 × 10⁹ | 1 × 10¹⁰ |
| | 15 | 53 | >220 | clear | clear | clear | 3 × 10⁹ | 1 × 10⁹ | 1 × 10¹⁰ |
| | 16 | 29 | >220 | clear | clear | clear | 5 × 10⁹ | 2 × 10⁹ | 1 × 10¹⁰ |
| | 17 | 18 | >220 | clear | clear | clear | 4 × 10⁹ | 3 × 10⁹ | 1 × 10¹⁰ |
| | 18 | 47 | >220 | clear | clear | clear | 2 × 10⁹ | 1 × 10⁹ | 3 × 10¹⁰ |
| | 19 | 32 | >220 | clear | clear | clear | 2 × 10⁹ | 2 × 10⁹ | 2 × 10¹⁰ |
| | 20 | 19 | >220 | clear | clear | not mixable | 3 × 10⁹ | 2 × 10⁹ | — |
| according to invention | 21 | 61 | >220 | clear | clear | clear | 2 × 10⁹ | 2 × 10⁹ | 1 × 10¹⁰ |
| | 22 | 65 | >220 | mixable slightly cloudy | clear | clear | — | 1 × 10⁹ | 2 × 10¹⁰ |
| | 23 | 25 | >220 | clear | clear | clear | 1 × 10⁹ | 2 × 10⁹ | 1 × 10¹⁰ |
| | 24 | 30 | >220 | clear | clear | clear | 2 × 10⁹ | 2 × 10⁹ | 1 × 10¹⁰ |
| | 25 | 29 | >220 | clear | clear | clear | 1 × 10⁹ | 1 × 10⁹ | 2 × 10¹⁰ |
| | 26 | 35 | >220 | clear | clear | clear | 1 × 10⁹ | 1 × 10⁹ | 2 × 10¹⁰ |

What is claimed is:

1. A textile fiber finish comprising:

1 to 99 weight percent of compounds having the formula

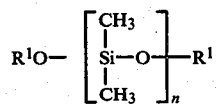

wherein
R¹ is 15 to 96 mole percent of hydrogen and 85 to 4 mole percent trialkylsilyl, triarylsilyl, tri(alkylaryl)silyl, phenyl, monoalkylphenyl, dialkylphenyl, trialkylphenyl, the sum of the total carbon atoms in the alkyl linked to the phenyl being no more than 12;
n is 3 to 30; and
99 to 1 weight percent of conventional finish components.

2. The finish of claim 1 wherein R¹ are hydrogen and trimethylsilyl groups.

3. The finish of claims 1 or 2 wherein n has a value from 6 to 20.

4. The finish of claims 1 or 2 which further comprises:
0 to 80 weight percent of non-polar or weakly polar oils,
0 to 90 weight percent of non-ionic tensides,
0 to 90 weight percent of ionogenic tensides,
the sum of the components being 100 weight percent and wherein the amount of non-ionic and ionogenic tensides is at least 1 weight percent.

5. The finish of claims 1 or 2 further comprising
10 to 95 weight percent of silico-organic compounds of formula (II);
0 to 80 weight percent of non-polar or weakly polar oils,
0 to 90 weight percent of non-ionic tensides, and
0 to 90 weight percent of ionogenic tensides,
the sum of the components being 100 weight percent.

6. The finish of claims 1 or 2 dissolved in a solvent.

7. The finish of claims 1 or 2 emulsified in a liquid in which it is not soluble.

* * * * *